No. 645,693. Patented Mar. 20, 1900.
J. H. SHARP.
CORN STUBBLE CUTTER.
(Application filed Nov. 6, 1899.)

(No Model.)

WITNESSES:
F. L. Ourand.
George J. Huber.

INVENTOR
John H. Sharp.
BY
Parker & Sweet
ATTORNEY

THE NORRIS PETERS CO., PHOTO-LITHO., WASHINGTON, D. C.

UNITED STATES PATENT OFFICE.

JOHN H. SHARP, OF COLUMBUS, NEW JERSEY.

CORN-STUBBLE CUTTER.

SPECIFICATION forming part of Letters Patent No. 645,693, dated March 20, 1900.

Application filed November 6, 1899. Serial No. 736,079. (No model.)

*To all whom it may concern:*

Be it known that I, JOHN H. SHARP, a citizen of the United States, residing at Columbus, in the county of Burlington and State of New Jersey, have invented certain new and useful Improvements in Corn-Stubble Cutters; and I do hereby declare the following to be a full, clear, and exact description of the invention, such as will enable others skilled in the art to which it appertains to make and use the same.

My present invention relates to that class of machines known as "corn-stubble cutters," and designed for the purpose of cutting and splitting up the short stubble that is left after harvesting the corn, whereby the separated particles of such stubble are left upon the soil to decay and enrich the same and the soil placed in condition to receive a sowing of seed or the planting of other crops.

The object of my invention is to provide a compact, strong, and simplified construction, combined with ease of management and great efficiency in the operation of the same.

Figure 1:
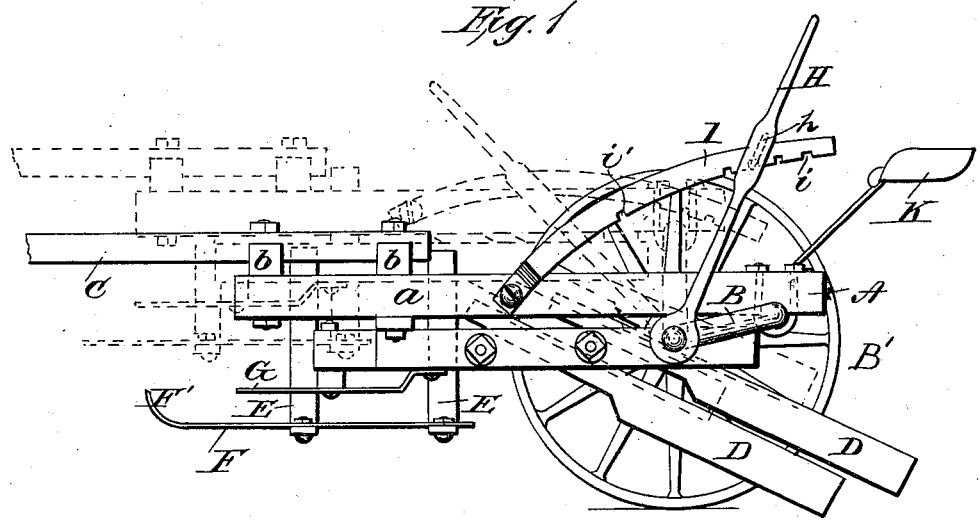
Figure 3:
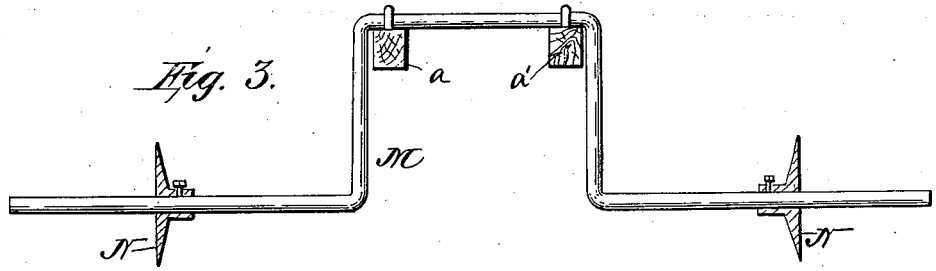
Figure 2:
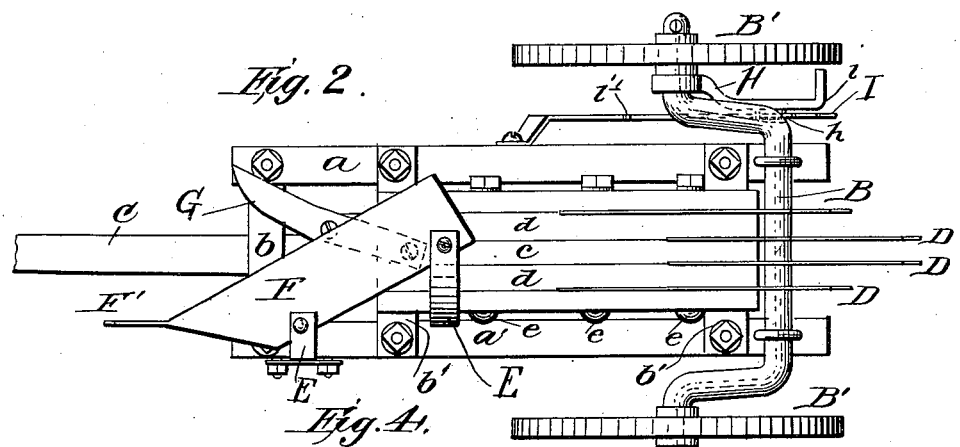
Figure 4:
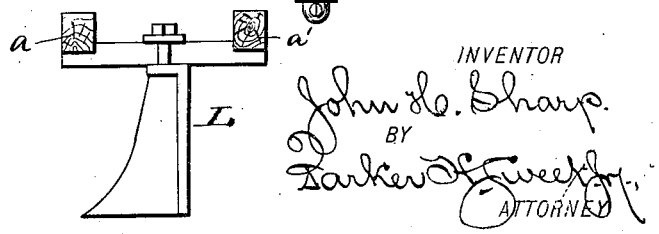

In the accompanying drawings, Figure 1 represents a side elevation of my improved machine; Fig. 2, a bottom plan view of the same; Fig. 3, a detail view of an attachment for marking out rows, and Fig. 4 a detail view of a plow attachment to the rear of the machine.

Similar letters of reference occurring on the several figures indicate corresponding parts.

In carrying out my invention the narrow rectangular frame A is suitably journaled at its rear end to the crank-axle B, while the front of the same is provided with a vehicle-pole C, as shown. The rectangular frame A is composed of two side bars $a\ a'$, secured at the proper distance apart by means of the cross-bars $b$ upon the upper front part of the frame and by the cross-bars $b'$ upon the lower front and rear ends of the same, suitable bolts uniting the several parts securely together to provide a durable, compact, and light construction.

Beneath the frame A and rigidly secured to the cross-bars $b'$ is provided a central bar $c$, having two or more parallel bars $d$ arranged on each side thereof and adapted to be secured thereto by the bolts $e$, as shown in Fig. 2. The object of these bars is to provide ready means for securely holding the shanks of the rear cutting blades or knives D, which are adjusted in the desired position between said bars and therein securely clamped by the said bolts $e$, the blades being preferably adjusted in a slanting direction to the rear of the machine and arranged in pairs for the purpose of cutting and dividing the stubble remaining in the soil into small pieces. The blades D are each formed of a single straight piece of metal and the cutting edges thereof capable of being sharpened on one or both sides.

At the front of the frame A are provided two downwardly-projecting standards E, having their lower ends bent at right angles to receive the front cutting blade or knife F, which is secured thereto in a nearly-flat or slightly-inclined position, as shown. These standards E are so arranged with relation to the frame A that they may be used on either side thereof and are capable of vertical adjustment to meet the requirements of the class of work to be done. The cutting edge of the knife or blade F is set diagonally across the front of the machine and is provided at its point with an upwardly-curved projection or guard F' to deflect or clear the grass or weeds from the stubble that is to be cut. Upon the side of the frame opposite to that of the cutting blade or knife F is provided a guard-blade G, the edge of which is set in a reverse direction to that of the edge of said knife or blade F and the object of which is to clear away the tops of the stubble as it is cut, as also to hold the same in position during the operation of cutting.

The crank-axle B is provided with suitable machine-wheels B', and to one side of the crank-axle and rigidly secured thereto is provided an upwardly-projecting lever H, having a loop $h$ at or near the central part thereof, through which passes the flat segmental arm I, pivoted at its front end to the side bar $a$, as shown in Fig. 1. This segmental arm I is provided upon its free outer end with a series of notches $i$, which are adapted to engage with the loop $h$ upon said lever when it is drawn back to lower the frame and its cutting-blades to the desired height for cutting the stubble, and thereby hold the machine down to its work. Near the forward and pivoted end of the arm I is also provided a notch $i'$, which is adapted to engage with the loop $h$ on the arm I when the lever H is thrown forward to elevate and hold the frame A and its cutting-blades from contact with the ground, enabling the machine to be readily turned for operating upon another row of stubble or to be wheeled from the field or other place. A seat K is attached to the rear upper part of the frame A for the reception of the driver or operator, whose weight upon the same serves to assist in holding the cutting-blades down to their work when the machine is lowered in position for operation.

My improved machine is also capable of being readily adapted for digging potatoes by simply removing the rear cutting-blades D from the rear of the frame A and substituting the plow L in place thereof, the front cutting blade or knife F serving to cut off the tops of the vines and the guard-blade G to convey the same to one side out of the way. By means of the rod M, adapted to fit across the frame A and provided with disks or markers N, adjustably secured at suitable points upon said rod, a ready means is provided for marking out rows for planting crops or for other purposes.

Having thus described my invention, what I claim as new and useful, and desire to secure by Letters Patent, is—

1. A machine of the character described, composed of the narrow rectangular frame A provided with the front cutting-knife and guard, the series of rear cutting-blades, the vehicle pole and seat, and the segmental arm I arranged upon the side thereof, in combination with the crank-axle B, wheels B' and operating-lever H, substantially as specified.

2. A machine for cutting stubble, consisting of the rectangular frame A, pivoted at its rear end to the crank-axle B, provided with wheels B' and lever H; the said frame A being provided with the series of cutting-blades D secured at the rear of the machine between the central bar $c$ and parallel bars $d$, the front cutting-blade F, and guard G, substantially as specified.

3. In a machine for cutting stubble, the cutting-blade F, secured diagonally across the front of the frame A in a nearly-flat position upon the lower ends of the adjustable standards E, and provided with an upwardly-curved projection or guard F', in combination with the guard-blade G arranged upon said frame in a reverse direction to that of said cutting-blade F, substantially as and for the purpose specified.

In testimony whereof I affix my signature in presence of two witnesses.

JOHN H. SHARP.

Witnesses:
A. N. HUTCHINSON,
J. E. HARRISON.